No. 745,960. PATENTED DEC. 1, 1903.
I. F. GOOD.
APPARATUS FOR SEPARATING GRAPHITE OR OTHER MATERIALS
FROM ASSOCIATED IMPURITIES.
APPLICATION FILED OCT. 1, 1902.
NO MODEL. 2 SHEETS—SHEET 2.
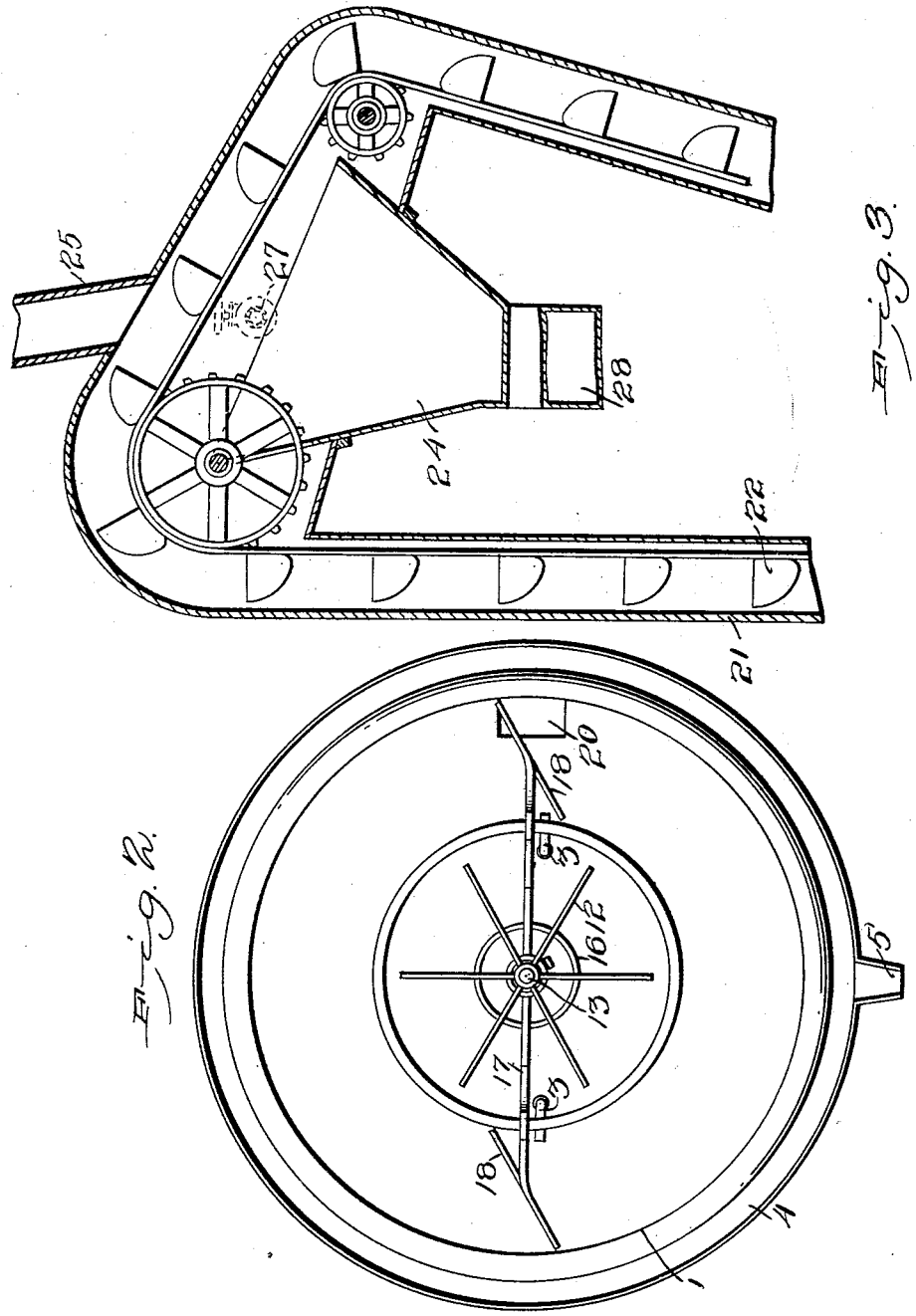

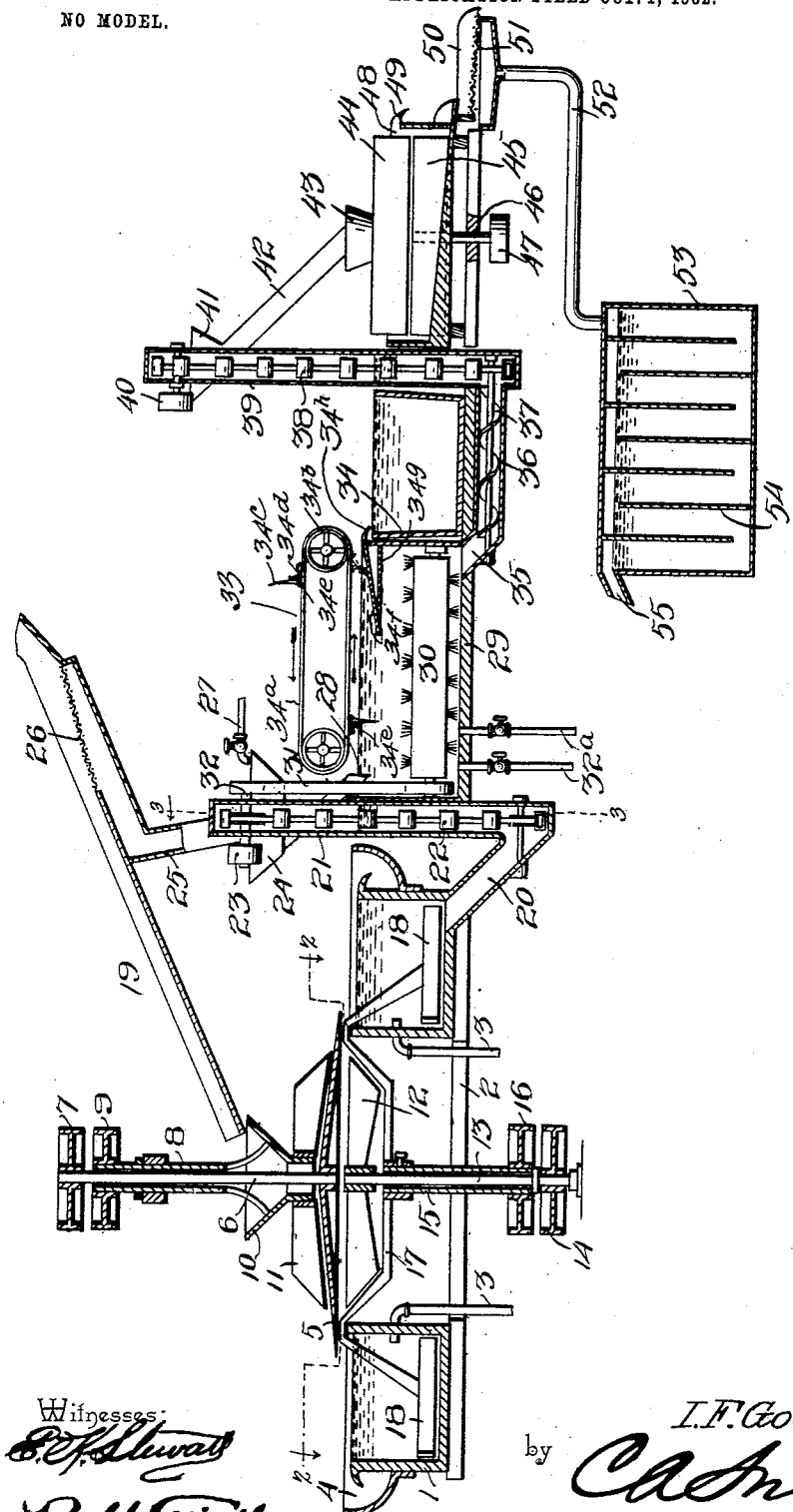

No. 745,960. Patented December 1, 1903.

UNITED STATES PATENT OFFICE.

ISRAEL F. GOOD, OF ALLENTOWN, PENNSYLVANIA, ASSIGNOR OF ONE-HALF TO GEORGE FRANCIS PETTINOS, OF BETHLEHEM, PENNSYLVANIA, AND JOHN HERBERT HARRIS, OF ALLENTOWN, PENNSYLVANIA.

APPARATUS FOR SEPARATING GRAPHITE OR OTHER MATERIALS FROM ASSOCIATED IMPURITIES.

SPECIFICATION forming part of Letters Patent No. 745,960, dated December 1, 1903.

Application filed October 1, 1902. Serial No. 125,532. (No model.)

*To all whom it may concern:*

Be it known that I, ISRAEL F. GOOD, a citizen of the United States, residing at Allentown, in the county of Lehigh and State of Pennsylvania, have invented a new and useful Apparatus for Separating Graphite or other Materials from Associated Impurities, of which the following is a specification.

This invention relates to an apparatus for separating graphite and other materials from associated impurities.

The object of the invention is in a ready, simple, rapid, thoroughly-feasible, and practical manner initially to separate pure graphite from any associated impurities and conserve it and then to effect saving of the bulk of whatever remains in the impurities separated out.

With these and other objects in view, as will appear as the nature of the invention is better understood, the same consists in the novel construction and combination of parts of an apparatus for separating graphite and other materials from associated impurities, as will be hereinafter fully described and claimed.

In the accompanying drawings, forming a part of this specification, and in which like numerals of reference indicate corresponding parts, there is illustrated one form of embodiment of the invention capable of carrying the same into practical operation, it being understood that the elements therein exhibited may be varied or changed as to shape, proportion, and exact manner of assemblage without departing from the spirit thereof.

In the drawings, Figure 1 is a view in vertical longitudinal section through an apparatus constructed in accordance with the present invention. Fig. 2 is a view in longitudinal section taken on the line 2 2 of Fig. 1 and looking in the direction of the arrow thereon. Fig. 3 is a view in sectional elevation, on an enlarged scale, taken on the line 3 3, Fig. 1, showing more particularly the conveying mechnism for elevating the impure materials from the primary separating-tank to the washing mechanism.

Referring to the drawings, 1 designates an annular tank constituting the primary separating-tank, the same being suitably supported upon a bed 2 and containing water supplied thereto by the pipes 3. The upper portion of the tank is surrounded by a trough 4, having a discharge-spout 5. (Clearly shown in Fig. 2.) Disposed above the tank, with its periphery overlapping the inner walls thereof, is an upward-dished disk 5, which is rigidly mounted upon a shaft 6, driven from a pulley 7 through a belt, (not shown,) and inclosing the shaft 6 is a tubular shaft 8, carrying at its upper end a pulley 9 and at its lower end a hopper 10 and a fan 11, the latter being disposed over the disk and rotating in a direction opposite thereto. The fan 11 produces a current of air which is mainly directed horizontally outward, but of which a small portion is directed downward owing to the vertical divergence of the blast, so producing a slight downward pressure upon the upwardly-dished disk 5, the utility of which will be hereinafter explained. Disposed below the disk is a second fan 12, rigidly secured to a shaft 13, driven by a pulley 14, and inclosing the shaft 13 is a tubular shaft 15, carrying at its lower end a pulley 16 and at its upper end a pair of arms 17, which are bent to project downward into the tank and carry at their terminals scrapers or stirrers 18.

Disposed over the hopper 10 is a chute 19, down which the finely-powdered rock, sand, or earth containing the graphite or other materials is fed. Thence it passes into the hopper and down upon the disk 5, where the finer particles or flakes of graphite are retained by the slight downward pressure of the blast of air from the fan 11, while the coarser portions drop into the tank 1. The flakes caught by the disk 5 under centrifugal action due to the rotation of the disk are discharged outward and upon the surface of the water contained in the tank, this action being assisted by the blast of air from the fan 12, which impinges the discharge of finely-divided graphite as it escapes in a sheet from the periphery of the disk and operates to spread it out over the water and also to impel it laterally to the trough 4, whence it escapes through the spout 5 and is caught in a suitable receptacle. The coarser portions of the graphite, rock, and sand or dirt mixed therewith are forced out of the tank and down an outlet 20, the scrapers 18, as shown in Fig. 2, being preferably disposed tangentially to their path of movement, thus to prevent the material from banking up against the inner wall of the tank, as will be readily understood. Communicating with the outlet 20 is a casing 21, housing an ordinary conveyer 22, driven from a pulley 23, and this conveyer elevates the material and discharges into a hopper 24. (Shown in detail in Fig. 3.) Communicating with the hopper is a spout 25, tapped into the chute 19, the mouth of the spout being covered by a fine screen 26 to effect separation of the finer particles of graphite which mix with the materials elevated by the conveyer 22. In the hopper the material has oil, either coal-oil or any other suitable kind, sprayed upon it from a pipe 27, and the mixed graphite, sand, &c., escapes through a chute 28 into a washing-tank 29, containing a rotary agitator 30, driven by a belt 31 from the upper shaft 32 of the conveyer 22, the water of the tank 29 being kept at boiling heat by steam supplied through pipes 32$^a$. The lighter particles of graphite separated by the agitator and that float on the surface of the water in the washing-tank are removed by a skimming device 33 and are discharged into a tank 34, containing water, whence they are removed. The skimming device comprises a belt 34$^a$, supported by two pulleys 34$^b$, disposed in horizontal alinement above the tank 29, one of the pulleys being driven by any suitable means, not necessary to be shown. Secured at regular intervals to the belt are curved arms 34$^c$, which are in length equal to the width of the tank, which latter is rectangular in shape, the arms being hinged to keepers 34$^d$, secured to the belt, a spring 34$^e$, coacting with each arm, operating normally to cause it always to occupy a position at right angles to the belt, while permitting it to yield, as indicated by dotted lines. The tank has associated with the upper portion of its rear end an inclined plate 34$^f$, supported in the tank by a plate 34$^g$, the outer end of the plate 34$^f$ being projected over the upper edge of the tank to constitute a lip 34$^h$. As the belt is rotated the arms or skimmer elements 34$^c$ travel along the upper surface of the material contained in the tank and convey it to the plate 34$^f$, up which it is pushed, the incline of the said plate operating to cause the arm to be folded inward toward the belt, as shown; but as soon as it passes the lip 34$^h$ the arm will resume its normal position.

The coarser portions of the graphite and any sand or the like remaining in the washing-tank pass down an outlet 35 into a conduit 36, in which is arranged a screw conveyer 37, which feeds the material to a second bucket conveyer 38, arranged in a housing 39, the conveyer being driven by a pulley 40, revolved by a belt, not necessary to be shown. The material elevated by the conveyer 38 is discharged into a hopper 41, thence passes through a chute 42 into the hopper 43 of a muller comprising two circular blocks of wood 44 and 45, the latter being stationary and the former being revolved by a shaft 46, driven by a pulley 47. The mulling-blocks are arranged within a tank 48, containing water and provided with a spout 49, which discharges into a trough 50, having a screen 51 to separate the sand, &c., from the graphite, the trough having connected with it a pipe or conduit 52, which connects with a settling-tank 53 of the usual construction. As the upper muller-block is rotated it operates to reduce the graphite to a pasty mass, which settles in the tank 53, whence it is removed, the tank being provided with the usual baffle-plates 54 common to such structures and with an overflow-spout 55.

The operation of this machine is extremely rapid and is continuous and effects in a thoroughly efficient and practical manner the separation of the graphite from any associated impurities.

Having thus described the invention, what I claim as new is—

1. An apparatus of the character specified, comprising a rotary receiving-table, and pneumatic means for holding the finer particles of graphite thereon while the coarser portions escape.

2. An apparatus of the character specified, comprising a rotary receiving-table, pneumatic means for holding the finer particles of graphite thereon while the coarser portions escape, and pneumatic means for impelling the finer particles laterally to a point of discharge.

3. An apparatus of the character specified, comprising an upward-dished receiving-table, a fan disposed above the table for holding the finer particles of graphite thereon while the coarser portions escape, and a fan disposed beneath the table for impelling the finer particles to a point of escape.

4. An apparatus of the character specified, comprising an annular tank, a rotary upward-dished receiving-table projecting over the tank, a fan disposed respectively above the table and rotating in the direction opposite that of the table, and rotary scrapers disposed within the tank.

5. An apparatus of the character specified, comprising means for separating the finer graphite from any associated impurities, means for conserving the finer particles, a washing-tank embodying agitating mechanism, means for conveying the residuum to the washing-tank, means for mixing oil with said residuum before being discharged into the washing-tank, a skimming device associated with the tank to remove the finer particles from the tank, a muller, means for conveying the coarser particles from the washing-tank to the muller, and a settling-tank communicating with the muller.

6. An apparatus of the character specified, comprising an annular tank having a peripheral trough associated therewith, an upwardly-dished receiving-table having its periphery disposed over the tank, blast mechanism disposed above and below the table and rotating in a direction opposite thereto, a hopper associated with the upper blast mechanism, rotary stirrers disposed within the tank, a washing-tank, conveying mechanism communicating with the annular tank and discharging into the washing-tank, a chute for discharging the coarser portions of graphite to the hopper of the upper fan and the finer particles to the washing-tank, means for supplying oil to the mixed finer and coarser portions before entry into the washing-tank, agitating and skimming mechanism associated with the washing-tank, a muller, conveying mechanism communicating with the washing-tank and discharging into the muller, and a settling-tank in communication with the muller.

In testimony that I claim the foregoing as my own I have hereto affixed my signature in the presence of two witnesses.

ISRAEL F. GOOD.

Witnesses:
  PETER G. CONRAD,
  DAVID T. HISKEY.